May 9, 1950 — I. SHAKOWITZ — 2,506,896
FOLDING TRESTLE
Filed Aug. 1, 1947 — 2 Sheets-Sheet 1
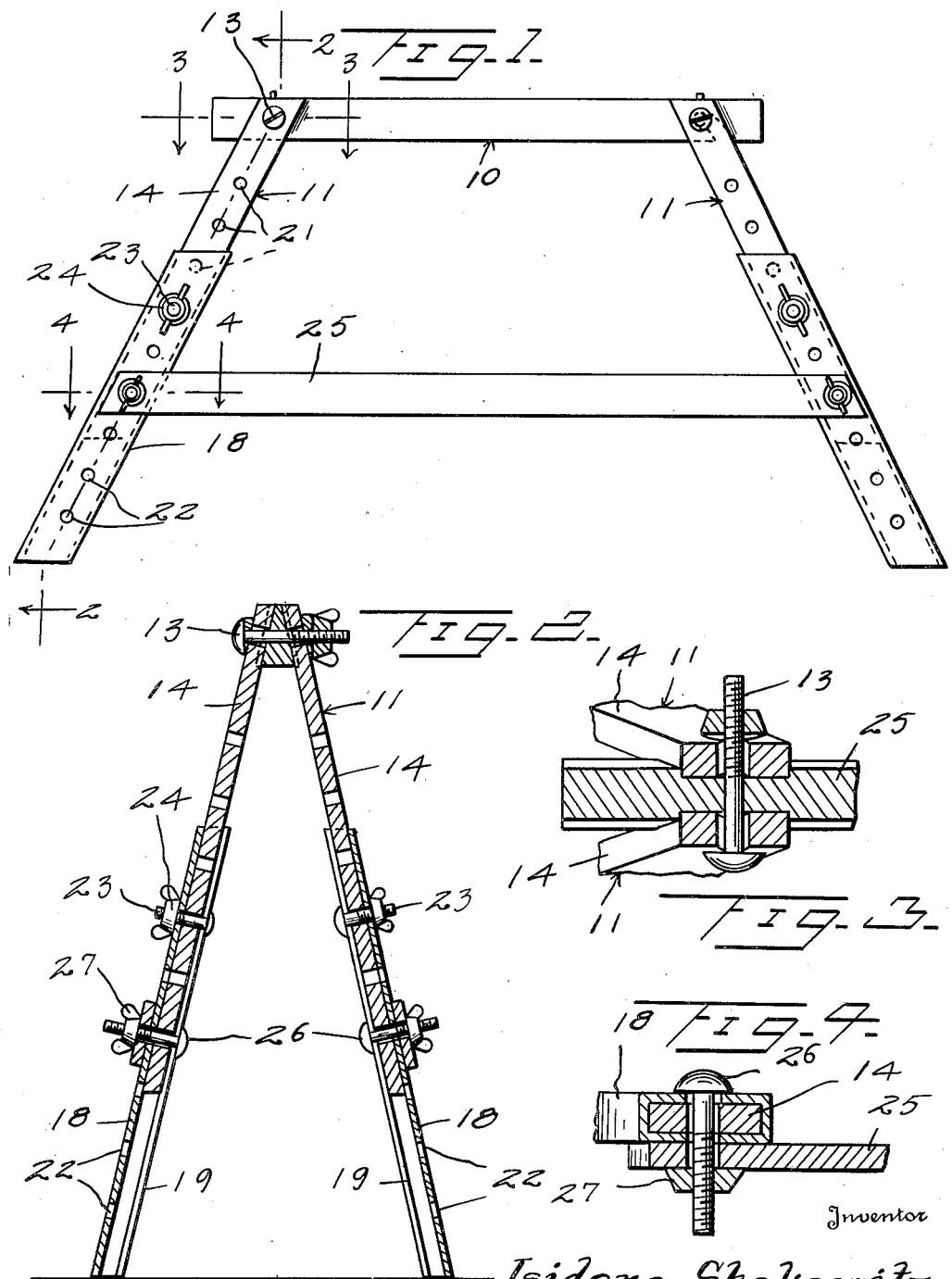
Inventor
Isidore Shakowitz
By Kimmel & Crowell
Attorneys

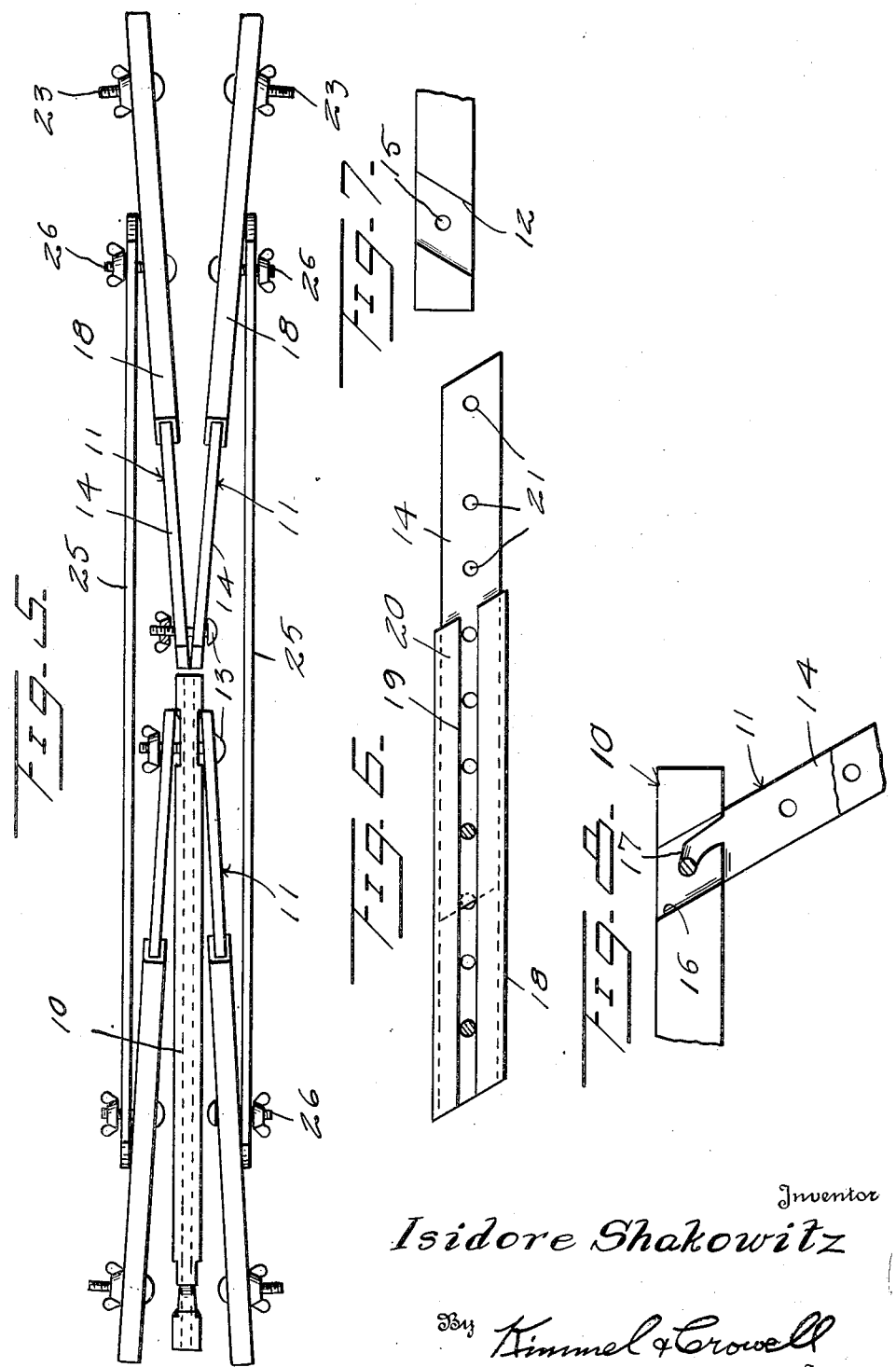

Patented May 9, 1950

2,506,896

UNITED STATES PATENT OFFICE 2,506,896

FOLDING TRESTLE

Isidore Shakowitz, Philadelphia, Pa.

Application August 1, 1947, Serial No. 765,497

1 Claim. (Cl. 304—5)

This invention relates to folding or collapsible trestles.

An object of this invention is to provide an improved trestle which is not only collapsible, but is also readily adjustable as to height.

Another object of this invention is to provide a trestle wherein each leg is formed of telescoping parts adapted to be adjusted endwise so as to support the top bar at a predetermined height.

A further object of this invention is to provide a collapsible trestle formed of a top bar, a pair of downwardly divergent legs and a bracing bar between the legs, the legs being extensible so that the top bar will be maintained in horizontal position and at a predetermined height.

With the above and other objects in view, my invention consists in the arrangement, combination and details of construction disclosed in the drawings and specification, and then more particularly pointed out in the appended claim.

In the drawings,

Figure 1 is a detail side elevation of a collapsible and extensible trestle constructed according to an embodiment of this invention, Figure 2 is a sectional view taken on the line 2—2 of Figure 1, Figure 3 is a fragmentary sectional view taken on the line 3—3 of Figure 1, Figure 4 is a fragmentary sectional view taken on the line 4—4 of Figure 1, Figure 5 is a plan view of the trestle in substantially collapsed position, Figure 6 is a detail inner side elevation of one of the supporting legs, Figure 7 is a fragmentary side elevation of the upper supporting bar, Figure 8 is a fragmentary side elevation of the upper bar at the end opposite from the end shown in Figure 7.

Referring to the drawings, the numeral 10 designates generally an upper horizontal bar which is supported by means of two pairs of legs generally designated as 11. The upper bar 10, adjacent one end thereof, is formed with a recess or notch 12 which is inclined to the vertical within which the upper end of an upper leg member 14 is adapted to be detachably secured.

A bolt 13 is adapted to engage through the upper ends of the legs 11 and through an opening 15 formed in the upper bar 10. The upper bar 10, as shown in Figure 2, is of substantially V-shape in transverse section so that the legs 11 will be disposed in downwardly divergent relation. The upper bar 10, adjacent the opposite end thereof is formed, as shown in Figure 8, with a recess 16 on each side thereof, and the bar 10 is also formed with an L-shaped slot 17 within which the upper securing bolt 13 is adapted to removably engage.

Each leg 11 includes an upper bar 14 and a lower tubular leg bar 18 which is split as indicated at 19 on the inner wall 20 thereof. The upper leg bar 14 is formed with a plurality of holes 21 spaced apart lengthwise of the upper bar or leg member 14, and the tubular leg member 18 is also formed with a plurality of spaced apart openings 22.

A bolt 23 is adapted to engage through registering openings 21 and 22 and is secured in adjusted position by means of a wing nut 24. A bracing bar 25 connects the leg members of the two pairs together and the bracing bars 25 are secured to the leg members 11 by means of bolts 26 passing through registering openings 21 and 22 of the leg members 14 and 18, and wing nuts 27 are threaded onto the bolts 26.

When the trestle hereinbefore described is in operative position, the leg members of each pair are disposed in downwardly divergent relation, as shown in Figure 1, being braced by the two bracing bars 25. The upper bar 10 may be raised to the desired height by moving the tubular leg member 18 lengthwise of the upper leg member 14. The two leg members 14 and 18 are securely bolted together by the bolts 23, and also by the bolts 26.

In the collapsing of the trestle, the bolts 13 and 26 are loosened and the bolt 13 engaging in the L-shaped slot 17 may be moved outwardly of this slot so that the upper bar 10 may be swung downwardly between one pair of leg members 11. The other pair of leg members 11 may be swung downwardly and inwardly from their upper ends, as shown in Figure 5. The leg members 11 in the collapsed position of the trestle will be disposed closely adjacent each other, the leg members and other related parts shown in Figure 5 being shown somewhat spaced apart for facility of reference.

The upper bar 10 can be applied to any industry by merely changing the dimensions of the bar and to suit the particular purpose of the particular mechanic.

I do not mean to confine myself to the exact details of construction herein disclosed, but claim all variations falling within the purview of the appended claim.

What I claim is:

A collapsible trestle comprising an upper horizontal bar, a first pair of recesses formed in the opposite sides of said bar adjacent one end thereof, a pair of supporting legs positioned at the upper ends thereof within said first pair of recesses, releasable clamping means securing said legs in said recesses, a second pair of recesses formed in the opposite sides of said bar adjacent the other end thereof, a downwardly opening L-shaped slot formed in said bar within the area of said second pair of recesses, a second pair of supporting legs, second clamping means including a transverse member engageable in the transverse leg of said slot and extending through the upper ends of said second pair of legs adapted to secure said second pair of legs within said second pair of recesses whereby exertion of lateral pressure on said second clamping means precludes downward movement of said second pair of legs and said second pair of recesses preclude lateral movement of said second pair of legs to tightly clamp said parts in related assembly, and cross bars pivotally connecting corresponding legs of each pair of legs.

ISIDORE SHAKOWITZ.

REFERENCES CITED

The following references are of record in the file of this patent:

UNITED STATES PATENTS

| Number | Name | Date |
|---|---|---|
| 249,508 | Douns | Nov. 15, 1881 |
| 843,118 | Struble | Feb. 5, 1907 |
| 1,226,112 | Pepin et al. | May 15, 1917 |
| 1,575,691 | Klee | Mar. 9, 1926 |